(12) United States Patent
Cardelli et al.

(10) Patent No.: US 6,826,751 B1
(45) Date of Patent: Nov. 30, 2004

(54) AMBIENT CALCULUS-BASED MODAL LOGICS FOR MOBILE AMBIENTS

(75) Inventors: Luca Cardelli, Cambridge (GB);
Andrew Gordon, Cambridge (GB);
Giorgio Ghelli, Pisa (IT)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/430,769

(22) Filed: Oct. 29, 1999

Related U.S. Application Data

(60) Provisional application No. 60/132,600, filed on May 5, 1999, and provisional application No. 60/125,010, filed on Mar. 18, 1999.

(51) Int. Cl.$^7$ .......................... G06F 9/46; G06F 17/10; H04L 9/00
(52) U.S. Cl. .......................... 718/100; 718/104; 703/2; 713/200
(58) Field of Search ................................. 709/100, 102, 709/101, 104, 200, 217–219; 713/200; 703/2

(56) References Cited

U.S. PATENT DOCUMENTS

| | | | | | |
|---|---|---|---|---|---|
| 5,754,782 | A | * | 5/1998 | Masada | 707/102 |
| 5,781,732 | A | * | 7/1998 | Adams | 345/751 |
| 6,421,667 | B1 | * | 7/2002 | Codd et al. | 706/45 |

OTHER PUBLICATIONS

Cardelli, Luca; Gordon, Andrew D.□□"Mobile Ambients: Annex"□□Jun. 23, 1997.*
Stansku, Peter; Zaslavsky, Arkady□□"Expressing Dynamics of Mobile Agent Systems Using Ambient Calculus"□□.*

Luca Cardelli and Andy Gordon. Anytime, Anywhere: Modal Logics for Mobile Ambients. Microsoft Research. University of Sussex, May 1999. 38 pages.
Francisco Miraglia and Ugo Solitro. Sheaves over Right Sided Idempotent Quantales. L. J. of the IGPL, vol. 6 No. 4, pp. 545–600, 1998.
Luca Cardelli. Distributed Mobile Computation in Obliq. Digital Equipment Corporation Systems Research Center, May 19, 1996. 49 pages.
Luca Cardelli. Abstractions for Mobile Computing. Microsoft Research. Apr. 14, 1999. 47 pages.
Luca Cardelli, What is the Web's Model of Computation?, WWW5 Workshop on Programming the Web: A Search for API's, 1996.
Luca Cardelli, Andrew D. Gordon, Abstractions for Mobile Computation, Technical Report, 1997.
Luca Cardelli, Andrew D. Gordon, A Calculus of Mobile Ambients, Technical Report, 1997.
Luca Cardelli, Distributed Mobile Computation in Obliq, Technical Report, 1996.
Luca Cardelli, Abstractions for Mobile Computation, Technical Report, MSR–TR–98–34, Aug. 1998.

* cited by examiner

*Primary Examiner*—Meng-Al T. An
*Assistant Examiner*—Syed J Ali
(74) *Attorney, Agent, or Firm*—Amin & Turocy, LLP

(57) ABSTRACT

Ambient calculus-based modal logics for mobile ambients are disclosed. Formal analysis mechanisms or frameworks with which mobile ambients can be described, and within which policies such as security policies can be tested against those ambients, are disclosed. In one embodiment, a computer-implemented method receives at least one container, where each container has at least one process. The method applies the containers, including their processes, against a predetermined modal logic. The modal logic is based on ambient calculus, and provides for spatial relationships among the processes of the containers. The containers and their processes are output, as applied against the logic.

24 Claims, 7 Drawing Sheets

Input: $(x). P\{x\}$

Output: $C$ → read → $P\{C\}$

700

AMBIENT CALCULUS-BASED MODAL LOGICS FOR MOBILE AMBIENTS

RELATED APPLICATIONS

This application is related to the cofiled, copending and coassigned application Ser. No. 09/430,225 entitled "Ambient Calculus-Based Modal Logic Model Checking".

FIELD OF THE INVENTION

This invention relates generally to mobile ambients and processes, and more specifically to ambient calculus-based modal logics for such ambients and processes.

BACKGROUND OF THE INVENTION

Computing has become increasingly interconnected. Whereas before computers were discrete, unconnected units, because of the Internet as well as other networks, they are increasingly fluid, interconnected units. A computer program, which may be made up of one or more executable processes, or threads, may be mobile. For example, a thread of the program may move from computer to computer over the Internet. It may be executed in a distributed fashion over many computers, or a different instance of the thread may be run on each of many computers.

The movement of threads from computer to computer, or even to different parts within the same computer, poses new security and other risks for which there is no formal analysis mechanism. For example, a thread may be unstable, such that having it be run on a particular computer may cause the computer to crash. More so, the thread may be malicious, such as part of a virus program, such that its purpose is to compromise the computers it moves to.

More specifically, there are two distinct areas of work in mobility: mobile computing, concerning computation that is carried out in mobile devices (laptops, personal digital assistants, etc.), and mobile computation, concerning mobile code that moves between devices (agents, etc.). Mobility requires more than the traditional notion of authorization to run or to access information in certain domains: it involves the authorization to enter or exit certain domains. In particular, as far as mobile computation is concerned, it is not realistic to imagine that an agent can migrate from any point A to any point B on the Internet. Rather an agent must first exit its administrative domain (obtaining permission to do so), enter someone else's administrative domain (again, obtaining permission to do so) and then enter a protected area of some machine where it is allowed to run (after obtaining permission to do so).

Access to information is controlled at many levels, thus multiple levels of authorization may be involved. Among these levels we have: local computer, local area network, regional area network, wide-area intranet and internet. Mobile programs should be equipped to navigate this hierarchy of administrative domain, at every step obtaining authorization to move further. Laptops should be authorized to access resources depending on their location in the administrative hierarchy.

In general, a process or thread resides within a container referred to as an ambient. The ambient includes one or more processes or threads, as well as any data, etc., that move with the processes or threads. An ambient that can move is referred to as a mobile ambient. The ambient can be any type of container: a software container such as a particular part of an operating system, for example, as well as a hardware container, such as a particular computer or peripheral device.

More specifically, an ambient has the following main characteristics. First, an ambient is a bounded placed where computation happens. The interesting property here is the existence of a boundary around an ambient. Examples of ambients include: a web page (bounded by a file), a virtual address space (bounded by an addressing range), a Unix file system (bounded within a physical volume), a single data object (bounded by 'Itself') and a laptop (bounded by its case and data ports). Non-examples are: threads (the boundary of what is "reachable" is difficult to determine) and logically related collections of objects.

Second, an ambient is something that can be nested within other ambients. For example, to move a running application from work to home, the application must be removed from an enclosing (work) ambient and inserted in a different enclosing (home) ambient. A laptop may need a removal pass to leave a workplace, and a government pass to leave or enter a country.

Third, an ambient is something that can be moved as a whole. If a laptop is connected to a different network, all the address spaces and file systems within it move accordingly and automatically. If an agent is moved from one computer to another, its local data should move accordingly and automatically. As mentioned, there is no formal analysis mechanism within the prior art for such mobile ambients. This means that there is no manner by which to describe formally, for example, a security policy for a given computer system, which could be applied against a mobile ambient within a formal analysis mechanism to determine if the ambient poses a security or other risk to the system. In particular, most formal analysis mechanisms, or frameworks, only provide for temporal distinction among processes and ambients, but assume that the processes and ambients are stationary—or otherwise do not provide for spatial distinction among them.

For these and other reasons, there is a need for the present invention.

SUMMARY OF THE INVENTION

The invention relates to ambient calculus-based modal logics for mobile ambients. That is, the invention provides for formal analysis mechanisms or frameworks with which mobile ambients can be described, and within which policies such as security policies can be tested against those ambients. In one embodiment, a computer-implemented method receives at least one container, where each container has at least one process. The containers can in one embodiment be referred to as ambients, and the processes as threads. The method applies the containers, including their resident processes, against a predetermined modal logic. The modal logic is based on ambient calculus, and provides for spatial relationships among the processes of the containers. The containers and their processes are then output, as they have been applied against the logic. As used herein, the phrase "applied against the logic" refers to testing for conformance against a policy or formula of the logic.

In differing embodiments of the invention, the modal logic has one or more of the following aspects, characteristics and qualities: a structural congruence relation between processes; reduction semantics; logical formulae such as true, negation, disjunction, inaction, location, composition, universal quantification over names, sometime modality, somewhere modality, location adjunct, and composition adjunct; derived connectives such as false, conjunction, implication, logical equivalence, decomposition, every component satisfaction, some component satisfaction, existential quantification over names, everytime modality, everywhere modality, and unsatisfiability; valid formulas, sequents and/or logical inference rules; quantales; and, intuitionistic linear logic.

Embodiments of the invention provide for advantages over the prior art. The modal logic can be used to formally describe a given mobile ambient, as well as a policy, such as a security policy, of a given computer. The mobile ambient can then be analyzed against the policy within the framework provided by the modal logic. Since the modal logic provides for spatial relationships among different processes of ambients, embodiments of the invention are particularly well suited for analysis of such mobile computing problems.

Embodiments of the invention include computer-implemented methods, computer-readable media, and computerized systems of varying scope. Still other embodiments, advantages and aspects of the invention will become apparent by reading the following detailed description, and by reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. (It is noted that the terms document and text are used interchangeably herein and should be construed as interchangeable as well.)

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
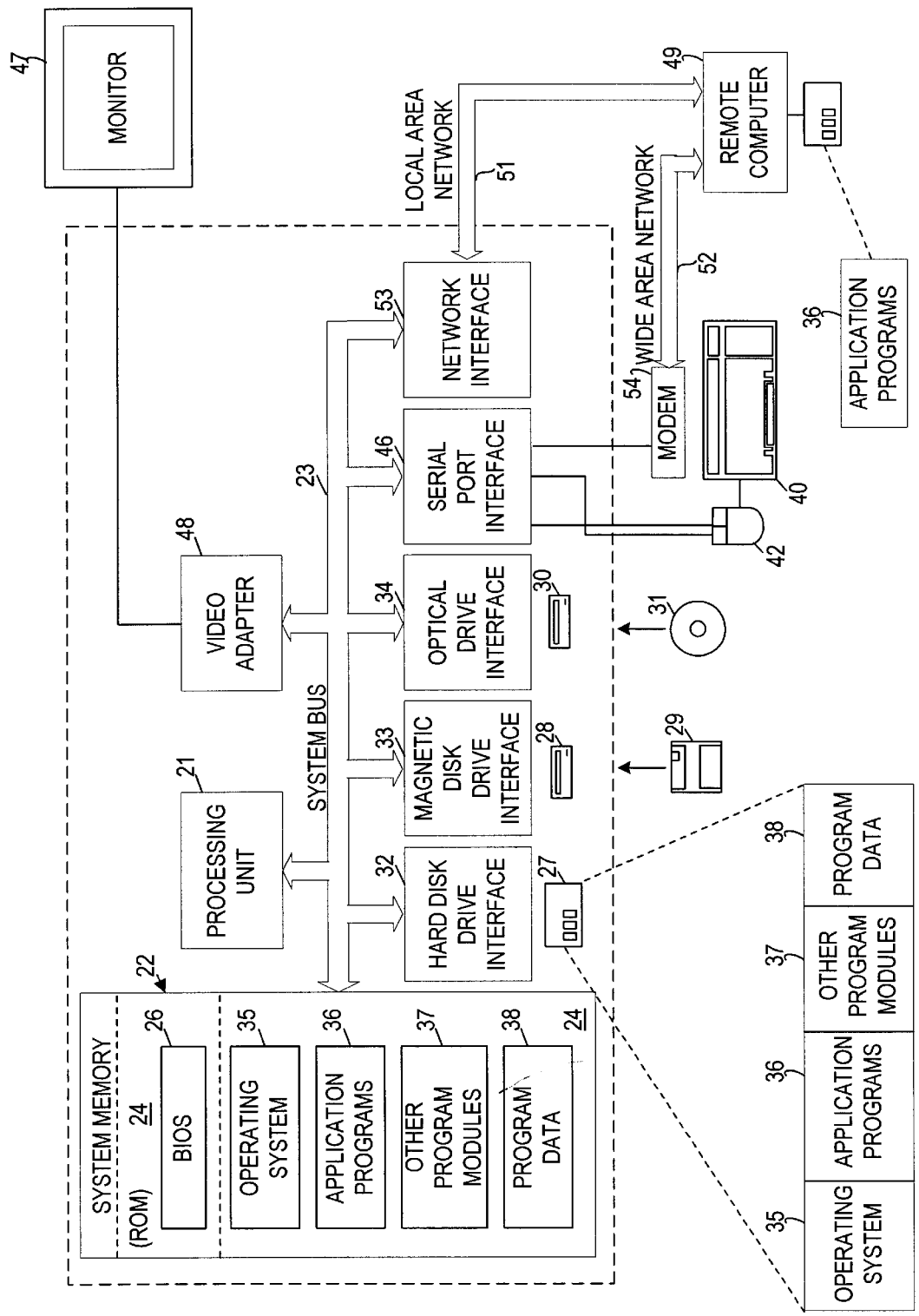
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device 40 coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Mobile Computing Environment

In this section of the detailed description, an example mobile computing environment in conjunction with which embodiments of the invention can be practiced. That is, an example mobile computing environment, made up of ambients (containers) and processes (threads), is presented. Modal logics according to the invention can then be used to represent these ambients and processes, as well as describe configurations of multiple such ambients and processes, and policies and formulas against which specific ambients and processes can be applied to determine if they satisfy the policies and formulas.

Figure 2:
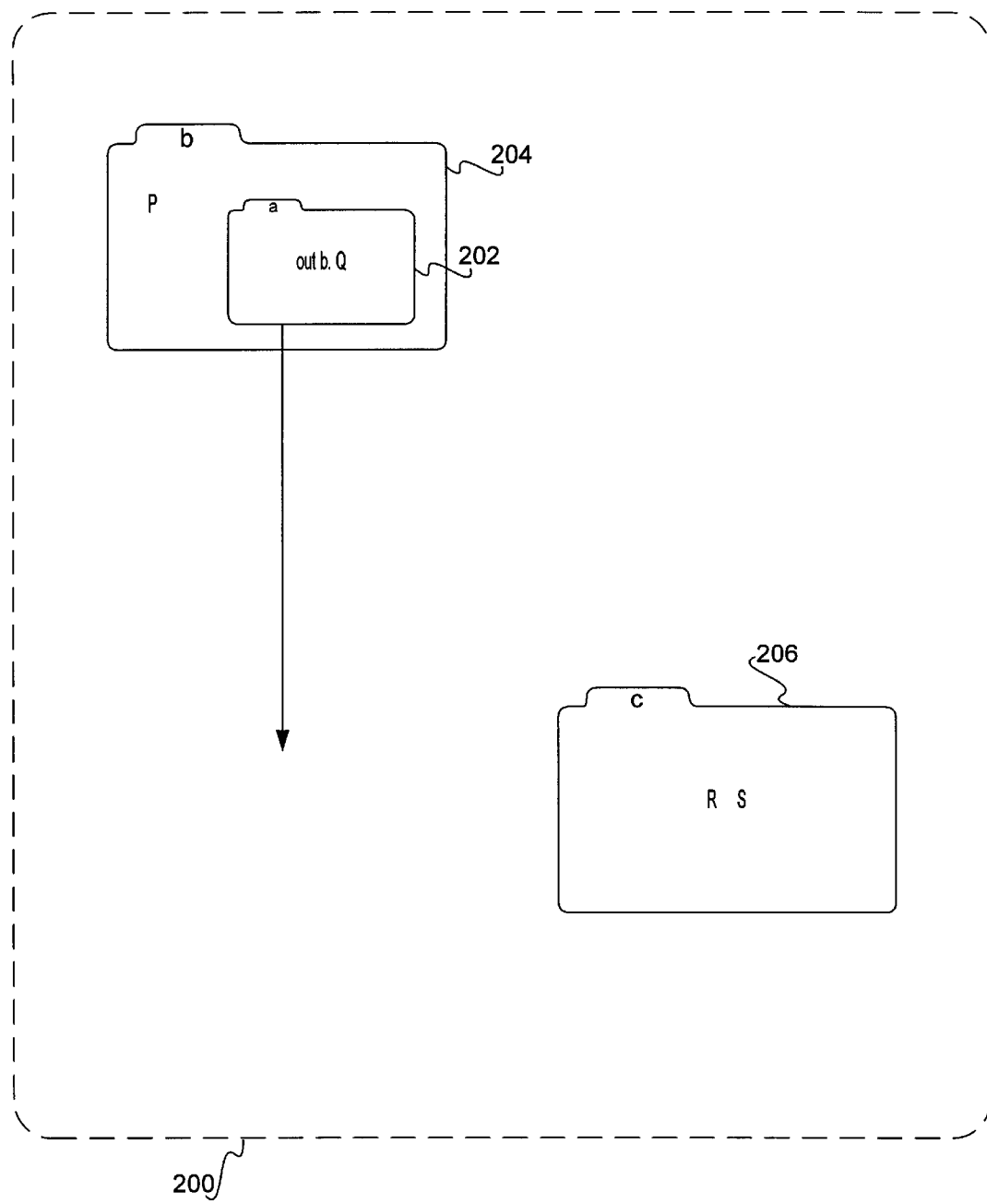
FIG. 2 is a diagram of an example environment of ambients and processes in conjunction with which embodiments of the invention may be practiced.

Referring to FIG. 2, an example mobile computing environment 200 is shown. The environment 200 specifically includes ambients, or containers, 202, 204 and 206. As shown in FIG. 2, the ambient 202 resides within the ambient 204. The ambient 202 is named a; the ambient 204 is named b; and, the ambient 206 is named c. A process P resides within the ambient 204, while a process Q resides within the ambient 202, and processes R and S reside within the ambient 206.

As has been described, each ambient, or container, can be a software or a hardware container. A software container may be a particular area defined by an operating system. Examples include stacks, heaps, sand boxes, as the latter term is referred to in the context of the Java programming language, etc. A hardware container may be a particular computer, such as a client or a server computer, as well as a particular computer peripheral. An example of a computer has been described in the preceding section of the detailed description.

More specifically, an ambient as used herein has the following properties:

Each ambient has a name. The name of an ambient is used to control access (entry, exit, communication, etc.). In a realistic situation the true name of an ambient would be guarded very closely, and only specific capabilities would be handed out about how to use the name. In our examples we are usually more liberal in the handling of names, for sake of simplicity.

Each ambient has a collection of local agents (referred interchangeably herein as threads or processes). These are the computations that run directly within the ambient and, in a sense, control the ambient. For example, they can instruct the ambient to move.

Each ambient may have a collection of subambients. Each subambient has its own name, agents, subambients, etc.

Names refer to:

something that can be created, passed around and used to name new ambients.

something from which capabilities can be extracted.

The logic of embodiments of the invention pertains to a mobile computing environment. Thus, the ambients of FIG. 2 are mobile. As shown in FIG. 2, for example, the ambient 202 is moving out of the ambient 204. There may be, for example, a particular policy or formula, expressed in the logic, that defines whether such a move can occur, such that it can be applied against the ambient 202 and the policy therein to determine whether such a move should be allowed to occur. Each of the ambients and their resident processes are also representable in the logic of embodiments of the invention, which is described in the next section of the detailed description.

Modal Logic

In this section of the detailed description, modal logics based on ambient calculus, and providing for spatial relationships among processes of containers, according to varying embodiments of the invention, are presented. The logic makes assertions about the containment and contiguity of containers. Part of the logic is concerned with matching the syntactic structure of expressions in the calculus. The matching of the structure of formulas to the structure of processes is done in a flexible manner, up to a process equivalence, such that it is not entirely syntactical. A number of logical inference rules, including rules for propositional logic, rules for modal operators such as time, space and validity, and rules for locations and process composition is also derived.

Basic Ambient Calculus

The following table summarizes a basic ambient calculus upon which a modal logic according to an embodiment of the invention is based. There is no name restriction in the basic ambient calculus. The subsequent tables summarize the syntax of processes, the structural congruence relation between processes, and the reduction semantics.

| P,Q,R::= | processes |
|---|---|
| 0 | inactivity |
| P\|Q | composition |
| !P | replication |
| M[P] | ambient |
| M.P | capability action |
| (n).P | input action |
| <M> | async output action |
| M::= | messages |
| n | name |
| in M | can enter into M |
| out M | can exit out of M |
| open M | can open M |
| $\epsilon$ | null |
| M.M' | path |

Inactivity for a process means that the process does nothing; that is, it has no activity. The composition P|Q means there is a resulting process composed of both P and Q. Replication means that the process has been replicated, or duplicated, as opposed to moving from one container to another; the replication ! P means the same effectively as an infinite array of replicas of P running in parallel. The ambient M[P] means that the process P resides within the container, or ambient, M. The capability action M.P means that the process is capable of the action, or functionality, M followed by the continuation P. The input action (n).P means that the process can accept an input message, bind it to n and continue with P. The asynchronous output action <M> means that the process performs an output of the message M and stops.

A message expression M can take one of several forms. It can be a name n. It can be one of the capabilities, in M, out M, or open M, whose effect when exercised, respectively, is to move the enclosing ambient into a sibling M, to move the enclosing ambient out its parent M, or to dissolve the boundary around an adjacent ambient M. It can be a null capability $\epsilon$. Or it may be a path M.M', whose effect is that of exercising first M and then M'. A process P has a set of free names, written as fn(P), which generally refers to any of the names textually occurring in the process P can take.

More formally, fn(P) is defined by the following table.

| | |
|---|---|
| (1) fn(0) $\triangleq \phi$ | |
| (2) fn(P\|Q) $\triangleq$ fn(P) $\cup$ fn(Q) | |
| (3) fn(!P) $\triangleq$ fn(P) | |
| (4) fn(M[P]) $\triangleq$ fn(M) $\cup$ fn(P) | |
| (5) fn(M.P) $\triangleq$ fn(M) $\cup$ fn(P) | |
| (6) fn((n).P) $\triangleq$ fn(P) − {n} | |
| (7) fn(<M>) $\triangleq$ fn(M) | |
| (8) fn(n) $\triangleq$ {n} | |
| (9) fn(in M) $\triangleq$ fn(M) | |
| (10) fn(out M) $\triangleq$ fn(M) | |
| (11) fn(open M) $\triangleq$ fn(M) | |
| (12) fn($\epsilon$) $\triangleq \phi$ | |
| (13) fn(M .M') $\triangleq$ fn(M) $\cup$ fn(M') | |

The thirteen statements within this table are explained as follows. The first statement states that there are no free names for the inactivity process. The symbol $\triangleq$ specifies that the left-hand side of the symbol is defined as the right-hand side of the symbol. This definition is applicable in any statement in which the symbol $\triangleq$ appears. The second statement states that the free names for the composition P|Q are the free names for P conjoined with the free names for Q. The third statement states that when a process is replicated from another process, it has the same free names as that latter process. The fourth statement states that the free names of a container M having therein a process P are the free names of M by itself conjoined with the free names of P—that is, M[P] cannot take on any names that are not allowed by either M itself or P itself. The fifth statement states that the free names of the capability action M.P cannot take on any names that are not allowed by either M itself or P itself. The sixth statement states that the free names of the input action (n).P are the free names of the process P, minus the name n.

The seventh statement states that the free names of the asynchronous output action <M> are the same as the free names of the message M itself. The eighth statement means that the free names of a name n is the singleton set containing n. The ninth statement means that the free names of the capability "can enter into M" are the same as the free names of M itself. Likewise, the tenth and eleventh statements means that the free names of the capabilities "can exit out of M" and "can open M," respectively, are the same as the free names of M itself. The twelfth statement states that there are no free names for the null capability. The last statement states that the free names of the path M.M' are equal to the free names of M conjoined with the free names of M'.

Furthermore, it is noted that the terminology P{n←M} is used for the substitution of the capability M for each free occurrence of the name n in the process P, and similarly for M{n←M}.

Structural congruence is defined as summarized in the following table. We use the symbol $\equiv$ to denote the relation of structural congruence, and in general write the phrase P≡Q to mean that processes P and Q are equal up to structural congruence.

| | |
|---|---|
| (1) P ≡ P | (Struct Refl) |
| (2) P ≡ Q $\Rightarrow$ Q ≡ P | (Struct Symm) |
| (3) P ≡ Q, Q ≡ R $\Rightarrow$ P ≡ R | (Struct Trans) |
| (4) P ≡ Q $\Rightarrow$ P\|R ≡ Q\|R | (Struct Par) |
| (5) P ≡ Q $\Rightarrow$ !P ≡ !Q | (Struct Repl) |

-continued

| | | |
|---|---|---|
| (6) P ≡ Q ⇒ M[P] ≡ M[Q] | | (Struct Amb) |
| (7) P ≡ Q ⇒ M.P ≡ M.Q | | (Struct Action) |
| (8) P ≡ Q ⇒ (x).P ≡ (x).Q | | (Struct Input) |
| (9) ε.P ≡ P | | (Struct ε) |
| (10) (M.M').P ≡ M.M'.P | | (Struct .) |
| (11) P\|Q ≡ Q\|P | | (Struct Par Comm) |
| (12) (P\|Q)\|R ≡ P\|(Q\|R) | | (Struct Par Assoc) |
| (13) !P ≡ P\|!P | | (Struct Repl Par) |
| (14) P\|0 ≡ P | | (Struct Zero Par) |
| (15) !0 ≡ 0 | | (Struct Zero Repl) |

This table is explained as follows. Structural reflectivity means that P is equal to P. Structural symmetry means that if P equals Q, then Q equals P. Structural transitivity means that if P equals Q and Q equals R, then P also equals R. The fourth statement means that if P equals Q, then the composition P|R is equal to the composition Q|R. The fifth statement means that if P equals Q, then the replication of P equals the replication of Q. The sixth statement means that if P equals Q the ambient M in which P is contained, M[P], equals the ambient M in which Q is contained, M[Q]. Similarly, the seventh statement means that if P equals Q, then the exercise of the expression M before the action of P, M.P, is equal to the exercise of the expression M before the action of Q, M.Q. The eighth statement means that if P equals Q, then P prefixed by the input action x is equal to Q prefixed by the input action x.

The ninth statement means that prefixing the process P with the null capability is the same as just stating the process P. The tenth statement means that stating (M.M).P is the same as stating M.M'.P. The eleventh statement is the commutative property, that the composition P|Q is equal to the composition Q|P. The twelfth statement is the associative property, that the composition of (P|Q) and R is equal to the composition of P and (Q|R). The thirteenth statement states that the replication of P is equal to the composition P|!P. The fourteenth statement is an identity statement, that the composition of P and the inactivity process is equal to P, while the fifteenth statement states that replicating the inactivity process is equal to the inactivity process itself.

Reduction is summarized in the next table. In it, the left side of the arrow (→) reduces to the expression on the right side of the arrow.

| | |
|---|---|
| (1) n[in m.P\|Q]\|m[R] → m[n[P\|Q]\|R] | (Red In) |
| (2) m[n[out m.P\|Q]\|R] → n[P\|Q]\|m[R] | (Red Out) |
| (3) open n.P\|n[Q] → P\|Q | (Red Open) |
| (4) (n).P\|(M) → P{n ← M} | (Red Comm) |
| (5) P → Q ⇒ n[P] → n[Q] | (Red Amb) |
| (6) P → Q ⇒ P\|R → Q\|R | (Red Par) |
| (7) P' ≡ P,P → Q,Q ≡ Q' ⇒ P' → Q' | (Red ≡) |
| (8) →* | reflexive and transitive closure of → |

Finally, the following syntactic conventions and abbreviations, as summarized in the next used herein. A fact is also provided.

Syntactic Conventions

| | | |
|---|---|---|
| !P\|Q | is read | (!P)\|Q |
| M.P\|Q | is read | (M.P)\|Q |
| (n).P\|Q | is read | ((n).P)\|Q |

Abbreviations

| | | |
|---|---|---|
| n[ ] | ≜ n[0] | |
| M | ≜ M.0 | (where appropriate) |

Fact
n[P]≡m[P'] iff n=m and P≡P"

Logical Formulas

In this next sub-section, logical formulas of the modal logic, according to one embodiment of the invention, are presented. The logical formulas are based on a modal predicate logic with classical negation, as can be appreciated by those of ordinary skill within the art. Many connectives are interdefinable: existential formulations are given preference, because they have a more intuitive meaning than the corresponding universal ones. Two tables are provided: one specifying the logical formulas, and the next specifying connectives derived from the logical formulas.

| A,B,C::= | |
|---|---|
| 1 T | true |
| 2 ¬A | negation |
| 3 A∨B | disjunction |
| 4 n[A] | location |
| 5 A'\|A" | composition |
| 6 ∃n.A | existential quantification over names |
| 7 ✦A | somewhere modality (spatial) |
| 8 ◊A | sometime modality (temporal) |
| 9 A@n | location adjunct |
| 10 A▷B | composition adjunct |

The logical formulas of the preceding table are described as follows. The first statement is a logical true, while the second statement is a logical negation and the third statement is a logical disjunction. The fourth statement means that the process A is located within the container, or ambient, n. The fifth statement is a logical composition. The sixth statement specifies the existential quantifier operation, that there is some process A within the container named n. The seventh statement specifies a spatial operator, that somewhere, at some location, the process A exists. That is, within some container, anywhere in the domain space being considered, the process A exists. Similarly, the eighth statement specifies a temporal operator, that at some point in time, the process A will exist (or currently exists). The ninth statement specifies that the process A exists within the container named n. Finally, the tenth statement is a logical composition adjunct.

| | | |
|---|---|---|
| 1 F | ≜ ¬T | false |
| 2 A ∧ B | ≜ ¬(¬A ∨ ¬B) | conjunction |
| 3 A ⇒ B | ≜ ¬A ∨ B | implication |
| 4 A ⇔ B | ≜ (A ⇒ B) ∧ (B ⇒ A) | logical equivalence |
| 5 A ∥ B | ≜ ¬(¬A\|¬B) | decomposition |
| 6 !A | ≜ A ∥ F | every component satisfies A |
| 7 ?A | ≜ A\|T (⇔ ¬!¬A) | some component satisfies A |
| 8 ∀n.A | ≜ ¬∃n.¬A | universal quantification over names |
| 9 ⊠A | ≜ ¬✦¬A | everywhere modality (spatial) |
| 10 □A | ≜ ¬◊¬A | everytime modality (temporal) |
| 11 A@ | ≜ ∀n.A@n | in every location context |
| 12 ▷A | ≜ T▷A | in every composition context |

The derived connectives of the preceding table are explained as follows. The first statement is the logical false, and is derived and defined as a function of the logical true.

The second statement is the logical conjunction, while the third statement is the logical implication and the fourth logical equivalence. The fifth statement specifies logical decomposition. The sixth statement defines !A as universal satisfaction, that every component satisfies the process A. Likewise, the seventh statement defines ?A as partial satisfaction, that some component satisfies the process A. The eighth statement defines the universal quantifier ∀ in terms of the existential quantifier ∃; that all the processes A are within the container n. The ninth statement states that the process A exists everywhere, from a spatial perspective, while the tenth statement states that the process A has existed, and still exists, at every time. The eleventh and twelfth statements specify the in every location context and the in every composition context, respectively, and are derived from the ninth and tenth logical formula statements of the logical formulas table.

Finally, the following syntactic conventions are utilized herein.

Parentheses are used for explicit precedence.

Infix ▷ binds stronger than '|', and they both bind stronger than the standard logical connectives.

Standard precedence is used for the standard logical connectives.

Quantifiers and modalities extend to the right as much as possible.

Satisfaction

The satisfaction relation P⊨A (process P satisfies formula A) is defined inductively in the following tables, where Π is the sort of processes, Φ is the sort of formulas, and Λ is the sort of names. Quantification and sorting of meta-variables are made explicit because of subtle scoping issues, particularly in the definition of P⊨∃n.A. Similar syntax for logical connectives is used at the meta-level and object-level.

The meaning of the temporal modality is given by reductions in the operational semantics of the ambient calculus. For the spatial modality, the following definitions are needed. The relation P↓P' indicates that P contains P' within exactly one level of nesting. Then, P↓*P' is the reflexive and transitive closure of the previous relation, indicating that P contains P' at some nesting level. Note that P' constitutes the entire contents of an enclosed ambient.

P↓P' iff ∃n, P". P≡n[P']|P"

↓* is the reflexive and transitive closure of ↓

| | | |
|---|---|---|
| ∀P:Π. | P ⊨ T | ≜ |
| ∀P:Π, A:Φ. | P ⊨ ¬A | ≜ ¬P ⊨ A |
| ∀P:Π, A,B:Φ. | P ⊨ A∨B | ≜ P ⊨ A ∨ P ⊨ B |
| ∀P:Π, n:Λ, A:Φ. | P ⊨ n[A] | ≜ ∃P':Π.P ≡ n[P'] ∧ P' ⊨ A |
| ∀P:Π, A,B:Φ. | P ⊨ A\|B | ≜ ∃P',P":Π.P ≡ P'\|P" ∧ P' ⊨ A ∧ P" ⊨ B |
| ∀P:Π, n:Λ, A:Φ. | P ⊨ ∃n.A | ≜ ∃m:Λ.P ⊨ A{n←m} |
| ∀P:Π, A:Φ | P ⊨ ✧A | ≜ ∃P':Π.P↓*P' ∧ P' ⊨ A |
| ∀P:Π, A:Φ | P ⊨ ◇A | ≜ ∃P':Π.P→*P' ∧ P' ⊨ A |
| ∀P:Π, A:Φ | P ⊨ A@n | ≜ n[P] ⊨ A |
| ∀P:Π, A,B:Φ. | P ⊨ A▷B | ≜ ∀P':Π.P' ⊨ A ⇒ P\|P' ⊨ B |

The logical connectives of the preceding table are read as follows:

Any process satisfies the T formula.

A process satisfies the ¬A formula if it does not satisfy the A formula.

A process satisfies the A∨B formula if it satisfies either the A or the B formula.

A process P satisfies the n[A] formula if there exists a process P' such that P≡n[P'] and P'⊨A.

A process P satisfies the A'|B formula if there exist processes P' and P" such that P≡P'|P" with P' satisfying A' and P" satisfying B.

A process P satisfies the formula ∃n.A if there is a name m such that P satisfies A{n←m}. (N.B.: the meta-theoretical definition above precisely captures the fact that m can be instantiated to, but cannot itself clash with any name free in P.)

A process P satisfies the formula ✧ A if A holds at some location P' within P, where "sublocation" is defined by P↓* P'.

A process P satisfies the formula ◇A if A holds in the future for some residual P' of P, where "residual" is defined by P*P'.

A process P satisfies the formula A@n if, when placed in an ambient n, the combination n[P] satisfies A.

A process P satisfies the formula A▷B if, given any parallel context P' satisfying A, the combination P'|P satisfies B. Another reading of P⊨A▷B is that P manages to satisfy B under any possible attack by an opponent that is bound to satisfy A. Moreover, "P satisfies (□A) ▷(□A)" means that P preserves the invariant A.

| | | |
|---|---|---|
| ∀P:Π. | ¬ P ⊨ F | |
| ∀P:Π,A,B: Φ. | P ⊨ A∧B | iff P ⊨ A ∧ P ⊨ B |
| ∀P:Π,A,B: Φ. | P ⊨ A⇒B | iff P ⊨ A ⇒ P ⊨ B |
| ∀P:Π,A,B: Φ. | P ⊨ A⇔B | iff P ⊨ A ⇔ P ⊨ B |
| ∀P:Π,A,B: Φ. | P ⊨ A\|\|B | iff ∀P',P":Π. P ≡ P'\|P" ⇒ P' ⊨ A ∨ P" ⊨ B |
| ∀P:Π,A: Φ. | P ⊨ !A | iff ∀P',P":Π. P ≡ P'\|P" ⇒ P' ⊨ A |
| ∀P:Π,A: Φ. | P ⊨ ?A | iff ∃P',P":Π. P ≡ P'\|P" ∧ P' ⊨ A |
| ∀P:Π, n: Λ,A: Φ. | P ⊨ ∀n.A | iff ∀m: Λ. P ⊨ A{n←m} |
| ∀P:Π,A: Φ. | P ⊨ ⊞A | iff ∀P':Π. P↓*P' ⇒ P' ⊨ A |
| ∀P:Π,A: Φ. | P ⊨ □A | iff ∀P':Π. P→*P' ⇒ P' ⊨ A |
| ∀P:Π,A: Φ. | P ⊨ A@ | iff ∀n: Λ. P ⊨ A@n |
| ∀P:Π,A: Φ. | P ⊨ ▷A | iff ∀P':Π. P\|P' ⊨ A |
| ∀P:Π,A,B: Φ. | P ⊨ ▷(A⇒B) | iff ∀P':Π. P'\|P ⊨ A ⇒ P'\|P ⊨ B (cf. P A▷B) |

The derived logical connectives of the preceding table are read as follows:

No process satisfies the F formula.

A process satisfies the A∧B formula if it satisfies both the A and the B formula.

A process satisfies the A⇒B formula if either it does not satisfy the A formula or it satisfies the B formula.

A process satisfies the A⇔B formula if it satisfies neither or both the A and B formulas.

A process P satisfies the A∥B formula if for every decomposition of P into processes P' and P" such that P≡P'|P", either P' satisfies A' or P" satisfies B.

A process P satisfies the !A formula if every parallel component P' of P (such that P≡P'|P", including P'=0) satisfies the A formula.

A process P satisfies the ?A formula if there is a parallel component P' of P (such that P≡P'|P''') that satisfies the A formula.

A process P satisfies the formula ∀n.A if for every name m, P satisfies A{n←m}.

A process P satisfies the formula ⊞A if A holds at every location P' within P, where "sublocation" is defined by P↓*P.

A process P satisfies the formula □A if A holds in the future for every residual P' of P, where "residual" is defined by P→P'.

A process P satisfies the formula A @ if, when placed in any ambient n, the combination n[P] satisfies A.

A process P satisfies the formula ▷A if for every process (i.e., for every context) the combination of P and with that process satisfies A.

If process P satisfies the formula A▷B, it means that in every context that satisfies A, the combination (of P and the context) satisfies B. Instead, if process P satisfies the formula ▷(A→B), it means that in every context, if the combination satisfies A then the combination satisfies B.

The following proposition states that the satisfaction relation is invariant under structural congruence.

P|P'⇒(P⊨A⇒P'⊨A)

A list of examples of the satisfaction relations is now provided. These examples should appear intuitively true from the definitions.

Location n[ ]⊨n[T]
n[ ]0⊨n[T], because n[ ]|0≡n[ ]
n[m[ ]]⊨n[m[T]]
¬0⊨n[T]
¬[ ]⊨m[T], if n≠m Composition n[ ]|m[ ] ⊨n[T]|m[T]
n[ ]|m[ ]⊨m[T]|n[T], because n[ ]|m[ ]|m[ ]|n[ ]
n[ ]|P⊨n[T]|T
n[ ]⊨n[T]|T, because n[ ]⊨n[ ]|0
!n[ ]⊨n[T]|T, because !n[ ]⊨n[ ]|!n[ ]
¬n[ ]⊨n[T]|n[T]
¬n[ ]|n[ ]⊨n[T]
¬!n[ ]⊨n[T]
¬n[ ]|open m⊨n[T]

Quantification n[ ]⊨∃m.m[T] iff ∃p. n[ ]⊨p[T] iff n[ ]⊨n[T] iff true
n[m[ ]]⊨∃n.n[n[T]] iff ∃p. n[m[ ]]⊨p[p[T]] iff false
0⊨∀n. ¬[T]

Spatial Modality n[m[ ]]⊨◆m[T]
¬n[m[ ]|m[ ]]⊨◆m[T]

Temporal Modality n[m[ ]]|open n ⊨ ◇ m[T]
n[n[ ]]|open n ⊨□(n[T] T)

Location Adjunct n[ ]⊨m[n[T]]@m
n[out m]⊨(◇ n[T])@m

Composition Adjunct n[ ]⊨m[T]▷(n[T]|m[T])
open n. m[ ] ⊨(□n[T]) ▷(◇ m[T])

Presence

| an n ≜ n[T]\| T | (there is now an n here) |
| no n ≜ ¬an n | (there is now no n here) |
| one n ≜ n[T] \| no n | (there is now exactly one n here) |
| unique n ≜ n[⋈no n] \| ⋈no n | (there is now exactly one n, and it is here) |
| !(n[T] ⇒ n[A]) | (every n here satisfies A) |

Validity and Satisfiability

It is noted that a formula is valid if it is satisfied by every process, and is satisfiable if it is satisfied by some process. This is summarized in the following table.

| vld A ≜ ∀P:Π. P ⊨ A | A is valid |
| sat A ≜ ∃P:Π. P ⊨ A | A is satisfiable |

From these definitions, the following are obtained:

vld A⇒sat A
vld A⇔¬sat¬A
vld (A∧B)⇔vld A∧vld B
vld (A∨B)⇔vld A∨vld B Validity is used for modeling logical inference rules, as described in the next definition. A linearized notation is used for inference rules, where the usual horizontal bar separating antecedencts from consequents is written '/', and ';' is used to separate antecedents.

Definition (Sequents and Rules)

Sequents

A⊢B≜vld (A⇒B)

Rules:

$A_1 \vdash B_1; A_n \vdash B_n / A \vdash B \triangleq$
$A_1 \vdash B_1 \wedge \ldots \wedge A_n \vdash B_n \Rightarrow A \vdash B$ (n≥0)
$A_1 \vdash B_1 // A_2 \vdash B_2 \triangleq$
$A_1 \vdash B_1 / A_2 \vdash B_2 \wedge A_2 \vdash B_2 / A_1 \vdash B_1$ Inference Rules In this section, logical inference rules from the satisfaction relation are derived.

The following is a non-standard presentation of the sequent calculus, where each sequent has exactly one assumption and one conclusion: A⊢B. This presentation is adopted because the logical connectives introduced later do not preserve the shape of multiple-assumption multiple-conclusion sequents. Moreover, in this presentation the rules of propositional logic become extremely symmetrical. Propositional logic is summarized in the following table.

| (A-L) | A∧(C∧D) ⊢ B // (A∧C) ∧D ⊢ B |
| (A-R) | A ⊢ (C∨D) ∨B // A ⊢ C∨(D∨B) |
| (X-L) | A∧C ⊢ B / C∧A ⊢ B |
| (X-R) | A ⊢ C∨B / A ⊢ B∨C |
| (C-L) | A∧A ⊢ B / A ⊢ B |
| (C-R) | A ⊢ B∨B / A ⊢ B |
| (W-L) | A ⊢ B / A∧C ⊢ B |
| (W-R) | A ⊢ B / A ⊢ C∨B |
| (Id) | / A ⊢ A |
| (Cut) | A ⊢ C∨B; A'∧C ⊢ B' / A∧A' ⊢ B ∨ B' |
| (T) | A∧T ⊢ B / A ⊢ B |
| (F) | A ⊢ F∨B / A ⊢ B |
| (¬-L) | A ⊢ C∨B / A∧¬C ⊢ B |
| (¬-R) | A∧C ⊢ B / A⊢¬C∨B |
| (∧) | A ⊢ B; A' ⊢ B' / A∧A' ⊢ B∧B' |
| (∨) | A ⊢ B; A' ⊢ B' / A∨A' ⊢ B∨B' |

The standard deduction rules of propositional logic, both for the sequent calculus and for natural deduction, are derivable from the rules of the preceding table, as can be appreciated by those of ordinary skill within the art. As usual, A⇒B can be defined as ¬A∨B.

For predicate logic the syntax of formulas (but not of processes) is enriched with variables ranging over names. These variables are indicated by letters x, y. z. Quantifiers bind variables, not names. Then, if fv(A)={$x_1, \ldots, x_k$} are the free variables of A and φ∈fv(A)→Λ is a substitution of variables for names, $A_\phi$ for A $\{x_1 \leftarrow \phi(x_1), \ldots, x_k \leftarrow \phi(x_k)\}$ is written, and the following is defined:

vld $A \triangleq P$: $\Pi$. $P \models A_\phi$

The following table summarizes quantifiers over names.

| | | |
|---|---|---|
| (∀-L) | A $\{x \leftarrow m\} \vdash B$ / $\forall x.A \vdash B$ | |
| (∀-R) | $A \vdash B$ / $A \vdash \forall x.B$ | Where $x \notin fv(A)$ |
| (∃-L) | $A \vdash B$ / $\exists x.A \vdash B$ | Where $x \notin fv(B)$ |
| (∃-R) | $A \vdash B \{x \leftarrow m\}$ / $A \vdash \exists x.B$ | |

This leads to the following □, ◇, ¤, ✧ properties:
(1) vld($\Box(A \wedge B) \Leftrightarrow \Box A \wedge \Box B$)
(2) vld ($¤(A \wedge B) \Leftrightarrow ¤A \wedge ¤B$)
(3) vld($\Box(A \vee B) \Leftrightarrow \Box \vee \Box B$)
(4) vld($¤(A \vee B) \Leftrightarrow ¤A \vee ¤B$)

In the following table, it is propositioned that □, ◇, and ¤, ✧ are modal S4:

| | | | | |
|---|---|---|---|---|
| (◇) | / $T \vdash \Diamond A \Leftrightarrow \neg \Box \neg A$ | | (¤) | / $T \vdash ¤A \Leftrightarrow \neg ¤ \neg A$ |
| (□K) | / $T \vdash \Box(A \Rightarrow B) \Rightarrow (\Box A \Box B)$ | | (¤K) | / $T \vdash ¤(A \Rightarrow B) \Rightarrow (¤A \Rightarrow ¤B)$ |
| (□T) | / $T \vdash \Box A \Rightarrow A$ | | (¤T) | / $T \vdash ¤A \Rightarrow A$ |
| (□4) | / $T \vdash \Box A \Rightarrow \Box \Box A$ | | (¤4) | / $T \vdash ¤A \Rightarrow ¤¤A$ |
| (□M) | $A \vdash B$ / $\Box A \vdash \Box B$ | | (¤M) | $A \vdash B$ / $¤A \vdash ¤B$ |
| (□∧) | $\Box(A \wedge C) \vdash B$ // $\Box A \wedge \Box C \vdash B$ | | (¤∧) | $¤(A \wedge C) \vdash B$ // $¤A \wedge ¤C \vdash B$ |
| (□∨) | $A \vdash \Box(C \vee B)$ / $A \vdash \Box C \vee \Box B$ | | (¤∨) | $A \vdash ¤(C \vee B)$ // $A \vdash ¤C \vee ¤B$ |

It is noted, that because $\neg$vld $\Diamond A \Rightarrow \Diamond A$ $\neg$vld $¤A \Rightarrow ✧A$ the modalities are not S5.

Finally, location properties, location rules, composition properties, and composition rules are listed.

Location Properties
(1) vld(n[$A \wedge B$]$\Leftrightarrow$n[A]$\wedge$n[B])
(2) vld(n[$A \vee B$]$\Leftrightarrow$n[A]$\vee$n[B])

Location Rules

| | |
|---|---|
| (n[ ]) | $A \vdash B$ // $n[A] \vdash n[B]$ |
| (n[ ]∧) | $n[A \wedge C] \vdash B$ // $n[A] \wedge n[C] \vdash B$ |
| (n[ ]∨) | $A \vdash n[C \vee B]$ // $A \vdash n[C] \vee n[B]$ |

Composition Properties
(1) vld($A|B \Rightarrow B|A$)
(2) vld($A|(B|C) \Leftrightarrow (A|B)|C$)
(3) vld(($A \wedge B)|C \Rightarrow A|C \wedge B|C$)
(4) vld(($A \vee B)|C \Rightarrow A|C \vee B|C$)

Composition Rules

| | |
|---|---|
| (\|) | $A' \vdash B'$; $A'' \vdash B''$ / $A' \mid A'' \vdash B' \mid B''$ |
| (\|∧) | $(A \wedge B) \mid C \vdash D$ / $A \mid C \wedge B \mid C \vdash D$ |
| (\|∨) | $A \vdash (B \vee C) \mid D$ / $A \vdash B \mid D \vee C \mid D$ |
| ([?]\|) | $/ A' \mid A'' \wedge B' \parallel B'' \vdash A' \mid B'' \vee B' \mid A''$ |
| (\|¬) | $/ \neg(A' \mid A'') \wedge \neg(B' \mid B'') \vdash \neg(B' \mid A'') \vee (\neg A' \mid \neg B'')$ |
| (\|-E) | $A \vdash B'$ $\mid B''$; $A' \wedge (B' \mid C'') \vdash D$; $A'' \wedge (C' \mid B'') \vdash D$ / $(A \wedge (A' \wedge A'')) \wedge (C' \parallel C'') \vdash D$ |

Composition Rules

| | |
|---|---|
| (\|) | $A' \vdash B'$; $A'' \vdash B''/A' \mid A''\vdash B' \mid B''$ |
| (\|∧) | $(A \wedge B) \mid C \vdash D/A \mid C \wedge B \mid C \vdash D$ |
| (\|∨) | $A \vdash (B \vee C) \mid D/A \vdash B \mid D \vee C \mid D$ |
| (\|Π) | $/A' \mid A'' \wedge B'\Pi B'' \vdash A' \mid B'' \vee B' \mid A''$ |
| (\|¬) | $/\neg(A' \mid A'') \wedge \neg(B' \mid B'') \vdash \neg(B' \mid A'') \vee (\neg A' \mid \neg B'')$ |
| (\|-E) | $A \vdash B' \mid B''$; $A' \wedge (B' \mid C'') \vdash D$; $A'' \wedge (C' \mid B'') \vdash D$ / $(A \wedge (A' \wedge A'')) \wedge (C' \Pi C'') \vdash D$ |

Adjunctions

The following propositions and corollaries relate to location adjunct rules, and composition adjunct rules. The first proposition states that A@n and n[A] are adjuncts.

Proposition: Location Adjunct Rules
(n[ ]@) $n[A] \vdash B // A \vdash B@n$

Corollaries
(1) vld $n[A@n] \Rightarrow A$
(2) vld $A \Rightarrow n[A]@n$

Proposition: Composition Adjunct Rules
(|▷) $A \mid C \vdash B // A \vdash C \triangleright B$ Corollaries
(1) vld▷$B \mid B \Rightarrow B$
(2) vld $A \Rightarrow B \triangleright(A \mid B)$
(3) vld $A \triangleright B \mid B \triangleright C \Rightarrow A \triangleright C$ Reflecting Validity In this sub-section, validity and satisfiability are reflected into the logic, by means of the D operator:

| | |
|---|---|
| Vld A | $\triangleq (\neg A) \triangleright F$ |
| Sat A | $\triangleq \neg(A \triangleright F)$ |

From this validity and satisfiability, two propositions and one lemma are described:

Proposition: V/d and Sat
(1) vld Vld A$\Leftrightarrow$vld A
(2) vld Sat A$\Leftrightarrow$sat A Lemma: Vld, Sat Properties
(1) vld(Vld($A \wedge B$) $\Leftrightarrow$VldA$\wedge$VldB)
(2) vld(Vld($A \vee B$)VldA$\vee$VldB)

Proposition: Vld, Sat is Modal S5

| | |
|---|---|
| (Sat) | $/ T \vdash SatA \Leftrightarrow \neg Vld \neg A$ |
| (Vld K) | $/ T \vdash Vld(A \Rightarrow B) \Rightarrow ((VldA) \Rightarrow (VldB))$ |
| (Vld T) | $/ T \vdash (VldA) \Rightarrow A$ |
| (Vld 5) | $/ T \vdash (SatA) \Rightarrow (Vld Sat A)$ |
| (Vld M) | $A \vdash B$ / $VldA \vdash VldB$ |
| (Vld ∧) | $Vld(A \wedge C) \vdash B$ // $VldA \wedge VldC \vdash B$ |
| (Vld ∨) | $A \vdash Vld(C \vee B)$ // $A \vdash VldC \vee VldB$ |

Reflecting Name Equality

Finally, it is noted that it is possible to encode name equality within the logic in terms of validity. It is recalled that an n≡n[T]|T. One proposition then follows.

$$m = n \triangleq Vld(an \ in \ m \triangleright an \ n)$$

Proposition vld m=n⇔the names m and n are equal

Examples

Figure 6:
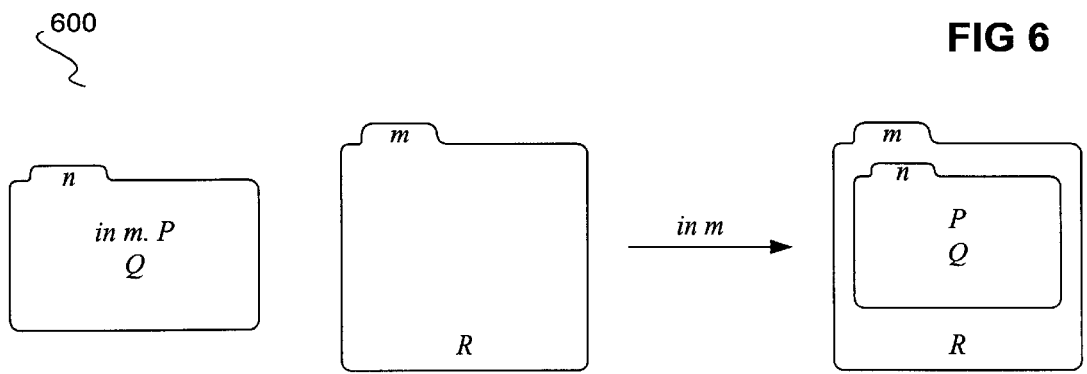
Figure 6:
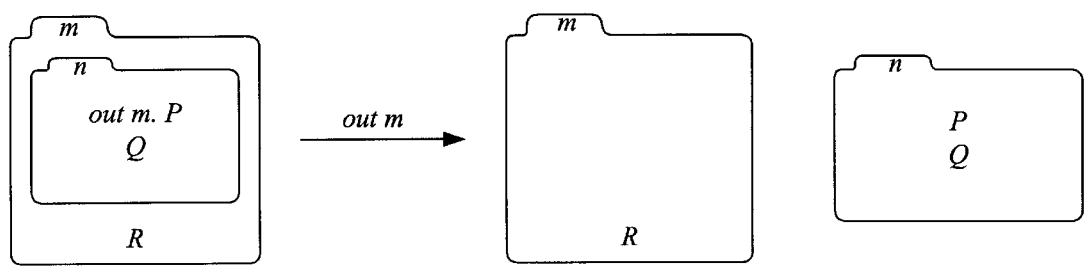
Figure 6:
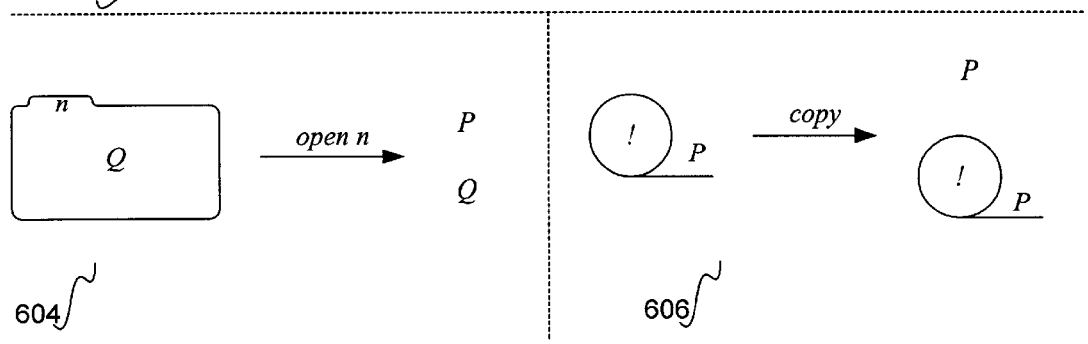
Figure 7:
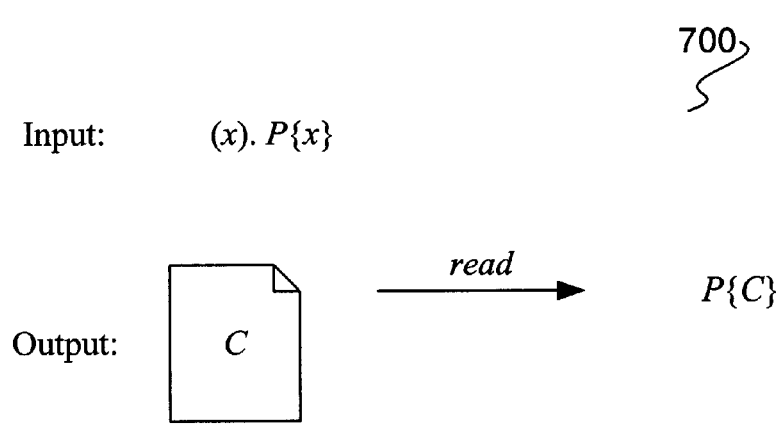

In this section of the detailed description, examples of mobile computing environments in conjunction with the modal logic of the preceding section are presented. Specifically, four separate situations are shown in the diagram of FIG. 6, and an additional situation is shown in the diagram of FIG. 7. Those of ordinary skill within the art can appreciate that the situations of FIGS. 6 and 7 are examples for illustrative purposes only, and do not represent a limitation on the invention.

Referring first to FIG. 6, four situations are presented, situations 600, 602, 604 and 606. In situation 600, a container n includes a process Q, and includes a policy telling the container how to behave. Specifically, the policy is in m.P, which instructs the container n including the process Q to move into the container m already having the policy R therein, as shown in situation 600. In situation 602, a container n includes a process Q, and the policy telling the container how to behave is out m.P, which instructs the container n including the process Q to move out of the container m also having the policy R therein, as shown. In situation 604, the policy or instruction open n.P is executed on the container n having the process Q, such that Q exits the container n as a result. Finally, in situation 606, a replicated instruction is executed on the process P, such that an additional process P is made (that is, process P is copied).

Referring next to FIG. 7, a communication operation referred to as a note is shown in the situation 700. The note can reside within a container. The capabilities that can be held by the note include names, such as n, as well as action capabilities, such as in n, out n, open n, or a path, such as C.C', as has been described in the modal logic section of the detailed description.

Methods

In this section of the detailed description, computer-implemented methods according to varying embodiments of the invention are presented. The methods make use of the modal logics described in the previous section of the detailed description, which are based on ambient calculus and provide for spatial relationships among processes of containers. The computer-implemented methods are desirably realized at least in part as one or more programs running on a computer—that is, as a program executed from a computer- or machine-readable medium such as a memory by a processor of a computer. The programs are desirably storable on a machine-readable medium such as a floppy disk or a CD-ROM, for distribution and installation and execution on another computer. Each of these methods can be used to effectuate the situations described in the preceding section of the detailed description in conjunction with FIGS. 6 and 7.

Figure 3:
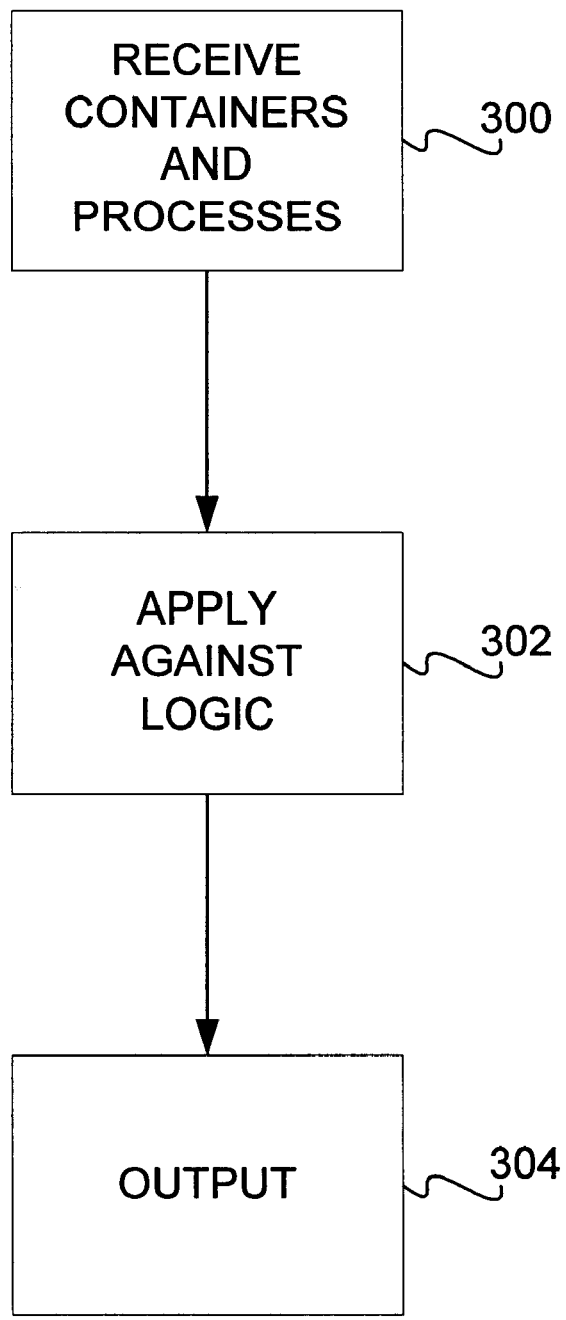
FIGS. 3–5 are flowcharts of methods according to different embodiments of the invention; and, FIGS. 6–7 are diagrams of example situations of mobile ambients utilized in conjunction with the modal logic of varying embodiments of the invention.

Referring first to FIG. 3, a flowchart of a method according to a first embodiment of the invention is shown. In 300, one or more containers, or ambients, are received, where each container, or ambient, includes at least one process. For example, the mobile computing environment described in conjunction with FIG. 2 may be received.

In 302, the containers and their processes are applied against a predetermined modal logic based on ambient calculus and providing for spatial relationships among the processes of the containers. The modal logic is described in the preceding section of the detailed description. "Applied against" as used herein means representing the containers and their processes in terms of the modal logic, and/or applying these representations against formula or policies also expressed in the logic.

Finally, in 304, the containers and their processes are output, as applied against the modal logic. The invention is not limited to the manner by which output is accomplished. For example, in one embodiment, it can be output to a further analysis program or software component, that allows for analysis and conclusions to be drawn. As another example, the output can be displayed on a display device, or printed to a printer, etc.

Figure 4:
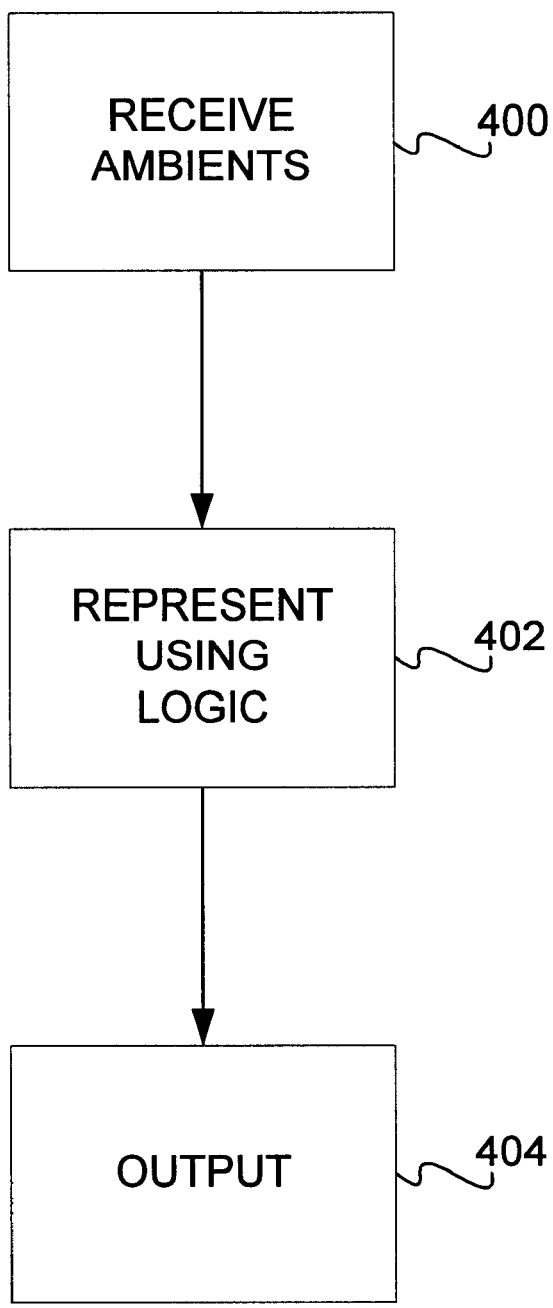

Referring next to FIG. 4, a flowchart of a method according to a second embodiment of the invention is shown. In 400, a configuration of a plurality of ambients, or containers, are received. Each container includes at least one process, or thread. The configuration may represent a specific mobile computing environment, such as the mobile computing environment described in conjunction with FIG. 2. The configuration may also define a policy, such as a security policy, against which specific processes are applied in conjunction with the modal logic.

In 402, the configuration of containers and their processes are represented using a predetermined modal logic based on ambient calculus and providing for spatial relationships among the processes of the containers. The modal logic is described in the preceding section of the detailed description. Thus, the containers and their processes, as in the configuration, are represented in terms of the modal logic.

Finally, in 404, the representation of the containers and their processes are output, as applied against the modal logic. The invention is not limited to the manner by which output is accomplished. For example, in one embodiment, it can be output to a further analysis program or software component, that allows for analysis and conclusions to be drawn. As another example, the output can be displayed on a display device, or printed to a printer, etc.

Figure 5:
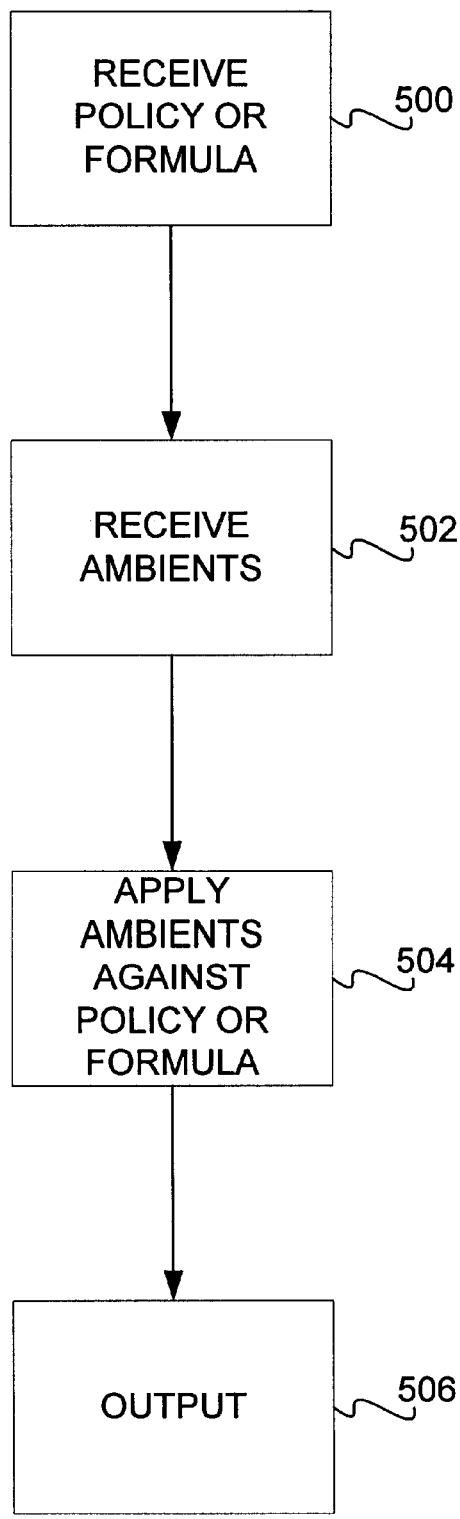

Referring finally to FIG. 5, a flowchart of a method according to a third embodiment of the invention is shown. In 500, a first representation of a plurality of ambients, defining a policy (such as a security policy) or a formula, is received. The representation is according to a predetermined modal logic, such as that described in the preceding section of the detailed description. Each ambient has at least one process, or thread. In 502, a second representation of a plurality of ambients is received, where each ambient has at least one process, or thread. The second representation is of a configuration of a mobile computing environment, such as that described in conjunction with FIG. 2.

In 504, the second representation is applied against the first representation within a predetermined modal logic based on ambient calculus and providing for spatial relationships among the threads of the ambients of the first and the second representations. This application is made to determine whether the configuration of the second representation satisfies the policy or formula of the first representation. That is, the second representation is tested against the first representation in accordance with the modal logic described in the preceding section of the detailed description.

Finally, in 506, the results of this testing and analysis are output—that is, whether or not the second representation in fact satisfies the first representation. The invention is not limited to the manner by which output is accomplished. For example, in one embodiment, it can be output to a further analysis program or software component, that allows for analysis and conclusions to be drawn. As another example, the output can be displayed on a display device, or printed to a printer, etc.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method, comprising:

receiving at least one container, each container having at least one process;

applying the at least one container, including the at least one process of each container, against a predetermined modal logic based on ambient calculus and providing for spatial relationships among the at least one process of each container, and outputting a result that indicates whether the at least one container, including the at least one process of each container, satisfies the predetermined modal logic, wherein the result is utilized to allow the at least one container to move or replicate when the at least one container satisfies the predetermined modal logic.

2. The method of claim 1, wherein each container comprises one of a hardware container and a software container.

3. The method of claim 1, wherein the predetermined modal logic comprises a predetermined processes syntax.

4. The method of claim 1, wherein the predetermined modal logic comprises a predetermined structural congruence relation between processes.

5. The method of claim 1, wherein the predetermined modal logic comprises a predetermined reduction semantics.

6. The method of claim 1, wherein the predetermined modal logic comprises at least one logic formula selected from the group essentially consisting of: true, negation, disjunction, inaction, location, composition, universal quantification over names, sometime modality, somewhere modality, location adjunct, and composition adjunct.

7. The method of claim 1, wherein the predetermined modal logic comprises at least one derived connective selected from the group essentially consisting of false, conjunction, implication, logical equivalence, decomposition, every component satisfaction, some component satisfaction, existential quantification over names, everytime modality, everywhere modality, in every location context, and in every composition context.

8. The method of claim 1, wherein the predetermined modal logic comprises at least one of: one or more valid formulas, one or more valid sequents, and one or more valid logical inference rules.

9. The method of claim 1, wherein the predetermined modal logic comprises a quantale.

10. The method of claim 1, wherein the predetermined modal logic has embedded therein intuitionistic linear logic.

11. A computer-implemented method, comprising:

receiving a configuration of a plurality of ambients, each ambient having at least one thread;

representing the plurality of ambients, including that at least one thread of each ambient, using a predetermined modal logic based on ambient calculus and providing for spatial relationships among the at least one thread of each ambient, and outputting a result that indicates whether the plurality of ambients, including the at least one thread of each ambient, as represented using the predetermined modal logic, satisfies a policy represented in ambient calculus, wherein the result is utilized to allow the plurality of ambients to move or replicate when the plurality of ambients satisfies the policy.

12. The method of claim 11, wherein the predetermined modal logic policy comprises a security policy.

13. A computer-implemented method, comprising:

receiving a first representation of a plurality of ambients defining one of a formula and a policy, each ambient having at least one thread, receiving a second representation of at least one ambient, each ambient having at least one thread;

applying the second representation against the first representation within a predetermined modal logic based on ambient calculus and providing for spatial relationships among the at least one thread of each ambient of the first and the second representation, to determine if the second representation satisfies the first representation; and outputting information that indicates whether the second representation satisfies the first representation for further analysis by a program that draws a conclusion based on the output information, wherein the conclusion is utilized to allow the second representation to move or replicate when the second representation satisfies the first representation.

14. The method of claim 13, wherein the policy comprises a security policy.

15. A machine-readable medium having instructions stored thereon for execution by a processor to perform a method, comprising:

receiving at least one container, each container having at least one process;

applying the at least one container, including the at least one process of each container, against a predetermined modal logic based on ambient calculus and providing for spatial relationships among the at least one process of each container; and outputting a result that indicates whether the at least one container, including the at least one process of each container, satisfies the predetermined modal logic, to at least one of a monitor, a printer, and a storage device, wherein the result is utilized to allow the at least one container to move or replicate when the at least one container satisfies the predetermined modal logic.

16. The medium of claim 15, wherein the predetermined modal logic comprises a predetermined processes syntax.

17. The medium of claim 15, wherein the predetermined modal logic comprises a predetermined structural congruence relation between processes.

18. The medium of claim 15, wherein the predetermined modal logic comprises a predetermined reduction semantics.

19. The medium of claim 15, wherein the predetermined modal logic comprises at least on logic formula selected from the group essentially consisting of: true, negation, disjunction, inaction, location, composition, universal quantification over names, sometime modality, somewhere modality, location adjunct, and composition adjunct.

20. The medium of claim 15, wherein the predetermined modal logic comprises at least on derived connective selected from the group essentially consisting of: false, conjunction, implication, logical equivalence, decomposition, every component satisfaction, some component satisfaction, existential quantification over names, everytime modality, everywhere modality, in every location context, and in every composition context.

21. The medium of claim 15, wherein the predetermined modal logic comprises at least one of: one or more valid formulas, one or more valid sequents, and one or more valid logical inference rules.

22. The medium of claim 15, wherein the predetermined modal logic comprises a quantale.

23. The medium of claim 15, wherein the predetermined modal logic has embedded therein intuitionistic linear logic.

24. A computerized system, comprising:

a component that receives at least one container, each container having at least one process;

a component that receives a policy represented as a predetermined modal logic based on ambient calculus and providing spatial relationships among the at least one process of each container; and a processor that compares an ambient calculus based representation of the at least one container with the predetermined modal logic based on ambient calculus to determine whether the at least one container satisfies the policy, wherein the container is allowed to move or replicate when the at least one container satisfies the policy.

* * * * *